(12) United States Patent
DiChiara et al.

(10) Patent No.: US 9,833,663 B2
(45) Date of Patent: Dec. 5, 2017

(54) SWIMMING GOGGLES

(71) Applicant: Liberty Sport, Inc., Fairfield, NJ (US)

(72) Inventors: Carmine S. DiChiara, Warren, NJ (US); Deni Crescenzi, Toronto (CA)

(73) Assignee: Liberty Sport, Inc., Fairfield, NJ (US)

( * ) Notice: Subject to any disclaimer, the term of this patent is extended or adjusted under 35 U.S.C. 154(b) by 609 days.

(21) Appl. No.: 14/285,049

(22) Filed: May 22, 2014

(65) Prior Publication Data
US 2015/0335956 A1    Nov. 26, 2015

(51) Int. Cl.
| | | |
|---|---|---|
| *G02C 1/00* | (2006.01) |
| *G02C 7/08* | (2006.01) |
| *A63B 33/00* | (2006.01) |
| *G02C 9/00* | (2006.01) |
| *G02C 13/00* | (2006.01) |

(52) U.S. Cl.
CPC ............. *A63B 33/002* (2013.01); *G02C 7/08* (2013.01); *G02C 9/00* (2013.01); *G02C 13/00* (2013.01); *A63B 2033/004* (2013.01); *G02C 2200/04* (2013.01)

(58) Field of Classification Search
CPC ......... G02C 11/08; G02C 5/008; B63C 11/12; B63C 2011/128; B63C 2011/126; B63C 11/02; B63C 11/26; B63C 2011/022; B63C 2011/121; B63C 2011/123; A63B 33/002; A63B 2033/004; A63B 33/00; A63B 2210/50; A63B 2207/02
See application file for complete search history.

(56) References Cited

U.S. PATENT DOCUMENTS

| | | | | |
|---|---|---|---|---|
| 4,373,788 A | * | 2/1983 | Herbert ................ | A63B 33/00 351/43 |
| 7,552,484 B2 | * | 6/2009 | Seynhaeve .......... | A63B 33/002 2/440 |
| 2005/0088613 A1 | * | 4/2005 | Jackson ................ | G02C 3/003 351/154 |
| 2012/0236250 A1 | * | 9/2012 | Yang ...................... | G02C 7/02 351/62 |

\* cited by examiner

*Primary Examiner* — Thomas K Pham
*Assistant Examiner* — Sharrief Broome
(74) *Attorney, Agent, or Firm* — Botos Churchill IP Law LLP

(57) ABSTRACT

A pair of swimming goggles includes a frame having a first sub-frame and a second sub-frame. The first and the second sub-frames have a first opening and a second opening defined therein. A first lens is secured in the first sub-frame and a second lens is secured in the second sub-frame. A first eye-piece and a second eye-piece are arranged adjacent to the first sub-frame and the second sub-frame, respectively. A third lens is secured in the first eye-piece and a fourth lens is secured in the second eye-piece. A first connecting member and a second connecting member releasably secure the first eye-piece and the second eye-piece to the first and the second sub-frames, respectively. At least one of the third and the fourth lens may take the form of a corrective lens.

4 Claims, 8 Drawing Sheets

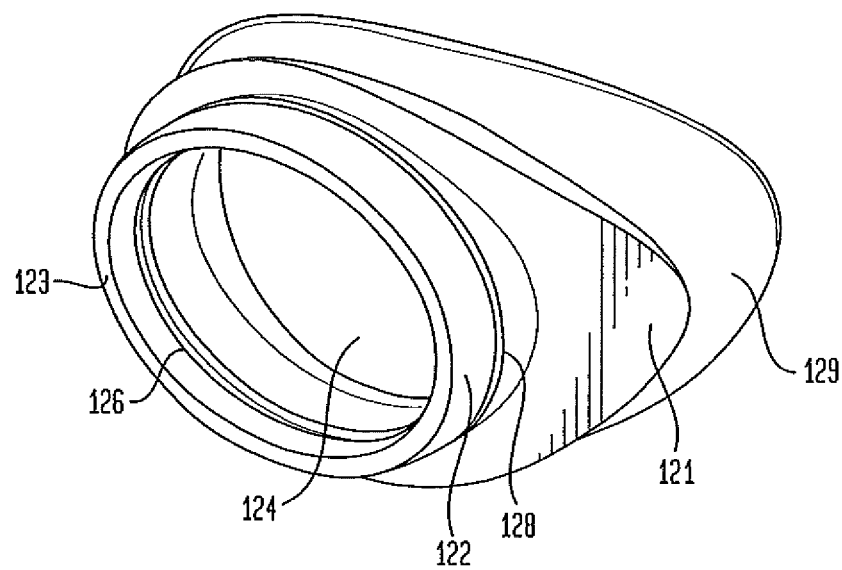
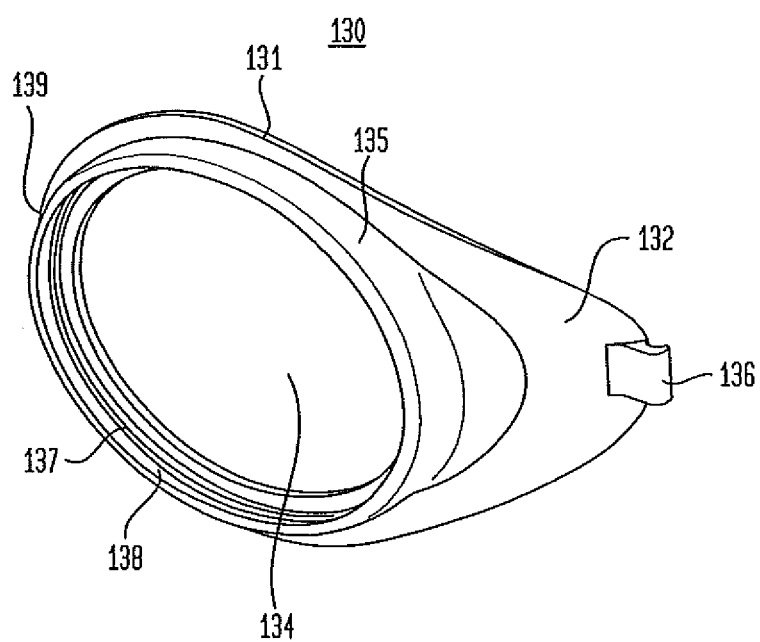

SWIMMING GOGGLES

FIELD OF THE INVENTION

The present disclosure relates in general to swimming goggles, and in particular to a pair of swimming goggles having a two-lens construction, one of which lens is preferably a corrective lens.

BACKGROUND OF THE INVENTION

Swimming goggles are known in the art for protecting eyes of a swimmer from the water and various elements generally present in the water. Conventional swimming goggles are known to at least partially cover the face of the user such that the water does not enter the space between the user's face and the goggles, thereby protecting the user's eye, while enabling the user to see through the goggles.

BRIEF SUMMARY OF THE INVENTION

An embodiment according to the present disclosure includes a pair of swimming goggles including a frame having a first sub-frame and a second sub-frame. The first and the second sub-frames have a first opening and a second opening defined therein. A first lens is secured in the first sub-frame and a second lens is secured in the second sub-frame. A first eye-piece and a second eye-piece are arranged adjacent to the first lens and the second lens, respectively, and are secured to the first sub-frame and the second sub-frame, respectively. A third lens is secured in the first eye-piece and a fourth lens is secured in the second eye-piece. A first connecting member and a second connecting member releasably secure the first eye-piece and the second eye-piece to the first and the second sub-frames, respectively.

Another embodiment according to the present disclosure includes a swimming goggles kit including a frame having a first sub-frame and a second sub-frame having a first opening and a second opening defined therein, respectively. Each of the first and the second sub-frames has a nasal end and a temporal end. A first bracket extends from the temporal end of the first sub-frame and a second bracket extends from the temporal end of the second sub-frame. A first indent and a second indent are defined along the nasal ends of the first and the second sub-frames, respectively. A first clip extension and a second clip extension are defined proximal to the free ends of the first and the second brackets, respectively. A first peripheral lip is formed about the first opening and a second peripheral lip is formed about the second opening. A first and a second lens are configured to be received in the first and the second sub-frames, respectively, and to be supported by the first peripheral lip and the second peripheral lip, respectively. A first and a second eye-piece have a first tubular segment and a second tubular segment, respectively, and are configured to abut the first and the second lens along the first and the second peripheral lips, respectively. The first and the second tubular segments have a first and a second internal groove defined therein, respectively, and a first external groove and a second external groove, respectively. A third lens and a fourth lens are configured to be received in the first and the second internal grooves, respectively.

A first connecting member and a second connecting member have a first peripheral stub extending from a first base and a second peripheral stub extending from a second base, respectively. The first and the second peripheral stubs include a first internal ridge and a second ridge, respectively, configured to be received in the first and the second external grooves, respectively. Each of the first and the second connecting members has a nasal end and a temporal end. A first contoured brace and a second contoured brace extend from the first and the second temporal ends of the first and the second connecting members, respectively. The first and the second braces comprise a first tab and a second tab, respectively. The first and the second connecting members comprise a first and a second ridge proximal to the nasal ends thereof configured to be received in the first and the second indents of the first and the second windows, respectively. An insertion of the first and the second ridges into the first and the second indents and an interlocking of the first and the second tabs with the first and the second clip extensions are configured to hold the first and the second connecting members to the first and the second sub-frames, respectively, in a snap-fit connection.

An aspect of the present disclosure includes a method for correcting vision in a pair of swimming goggles. The method includes securing a first lens to a sub-frame and inserting a second lens in an eye-piece. The second lens comprises a corrective lens. The method further includes securing the eye-piece adjacent to the first lens to the sub-frame, thereby creating a gap between the first and second lenses.

BRIEF DESCRIPTION OF THE DRAWINGS

Various embodiments of the present disclosure will now be described with reference to the appended drawings. It is to be appreciated that these drawings depict only some embodiments of the disclosure and are therefore not to be considered limiting of its scope.

FIG. 3 is a perspective view of an eye-piece of the goggles of FIG. 1, according to an embodiment of the disclosure;

FIG. 4 is a perspective view of a connecting member of the goggles of FIG. 1, according to an embodiment of the disclosure;

DETAILED DESCRIPTION

Figure 1:
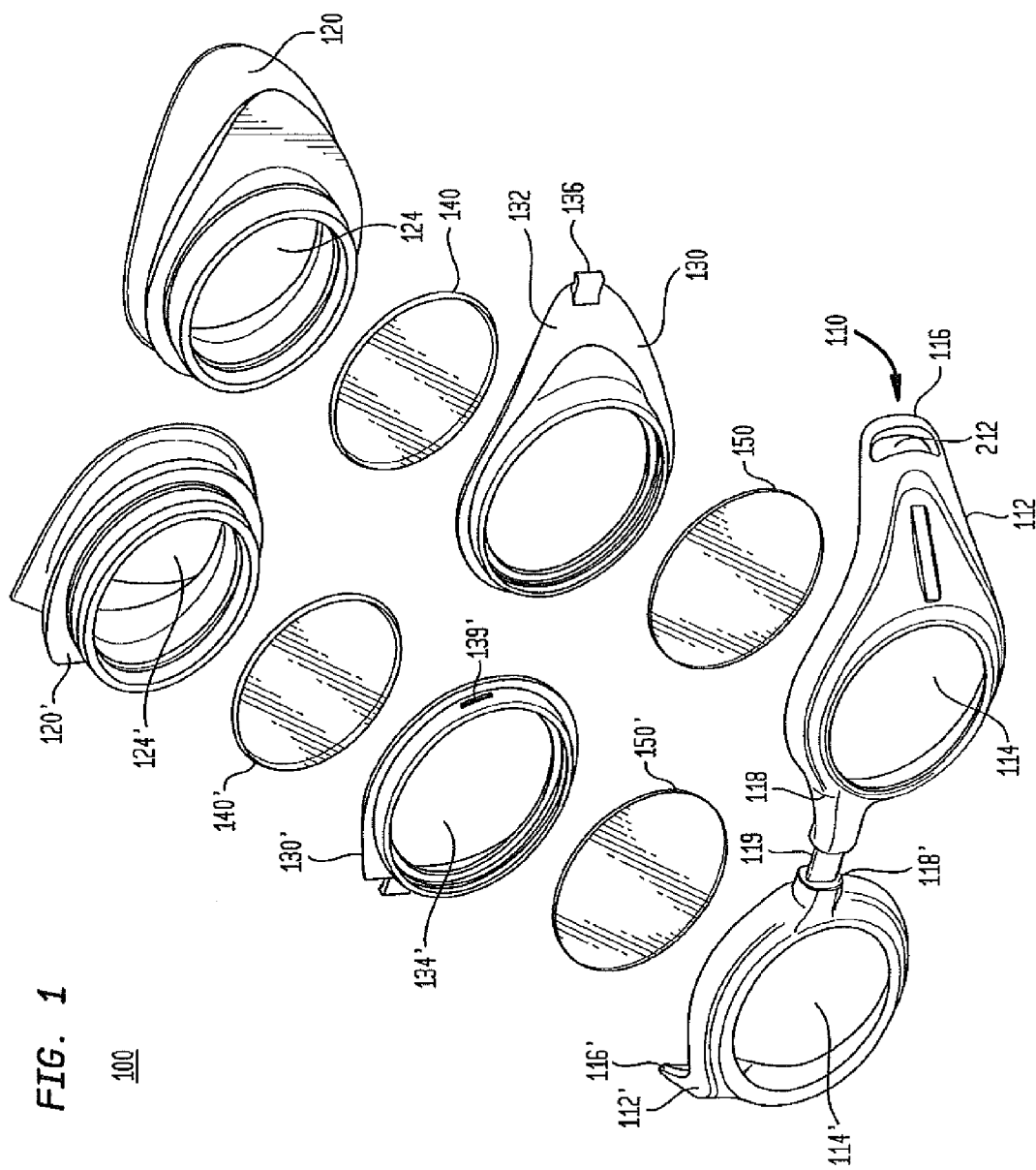
FIG. 1 is an exploded view of a pair of swimming goggles, according to an embodiment of the disclosure.

Despite the various improvements that have been made to the swimming goggles, conventional devices suffer from some shortcomings. For example, people who need corrective or prescription lenses to correct their vision, may have an impaired vision with conventional swimming goggles. Furthermore, conventional corrective or prescription lenses are designed to see through air and may not work well in water because of differences in the refraction of light along a lens/air interface relative to the refraction of light along a lens/water interface. It would be desirable to have a pair of swimming goggles configured to accommodate conventional prescription lenses to provide better vision to the wearer in water.

Still further, with conventional swimming goggles, there is an issue of fogging of the glasses. When a user puts on a pair of swimming goggles, there is some air trapped between the lens and the user's face. As the moisture in that air comes in contact with the lens, which is at a lower temperature for example due to exposure to the surrounding environment and water, the moisture condenses and forms a layer of condensation on the lens on the inside. Such fogging may severely limit the visibility through the goggles, forcing the user to take off the goggles to remove the condensation film from the lenses. Therefore, there may be a need for further improvements to the swimming goggles. For instance, a pair of swimming goggles which eliminates or significantly reduces the fogging of the lenses may be appreciated by swimmers. Still further, a user may appreciate a pair of goggles with interchangeable and easily replaceable components. Among other advantages, the present disclosure may address one or more of these needs.

As an initial matter, an embodiment of the swimming goggles includes components which are similar to one another while being mirror-symmetrical or bilateral symmetrical. For example, a right eye-piece is bilaterally similar to a left eye-piece, i.e., the right eye-piece may be reflection of the left eye-piece along a plane of symmetry passing between the two. In the drawings, the right eye-piece is labeled as 120, while the left eye-piece is labeled as 120'. For the ease of readability, in the following description, only one component will be referred to and described in detail and it will be understood that the analogous second component has similar structural and functional characteristics. It will, of course, be understood that in other embodiments, the left and right components, for example, the left eye-piece and the right eye-piece of a swimming goggles may not be mirror-symmetrical to one another.

Referring now to FIG. 1, a pair of swimming goggles 100 is illustrated, according to an embodiment of the disclosure. The swimming goggles 100 include a frame 110 having a first sub-frame 112 and a second sub-frame 112'. In an exemplary embodiment, the second sub-frame 112' is a mirror reflection of the first sub-frame 112. For sake of simplicity, only the first sub-frame 112 and the associated components will be described detail below. It will be understood that the frame also includes corresponding components associated with the second sub-frame 112'. One or more of the components associated with the second sub-frame 112' will be referred to in the description with a prime (') in the following description. The sub-frame 112 has an opening 114 defined therein. An eye-piece 120 is configured to be attached to the sub-frame 110. The eye-piece 120 has an opening 124 defined therein. The opening 124 of the eye-piece 120 is configured to align with the opening 114 of the sub-frame 112, when the eye-piece 120 is secured to the sub-frame 112. A connecting member 130 secures the eye-piece 120 to the sub-frame 112, as will be explained in further detail below. A lens 140 is arranged within the eye-piece 120 to extend across the opening 124. A second lens 150 is arranged between the sub-frame 112 and the eye-piece 120 to extend across the opening 114.

Figure 2:
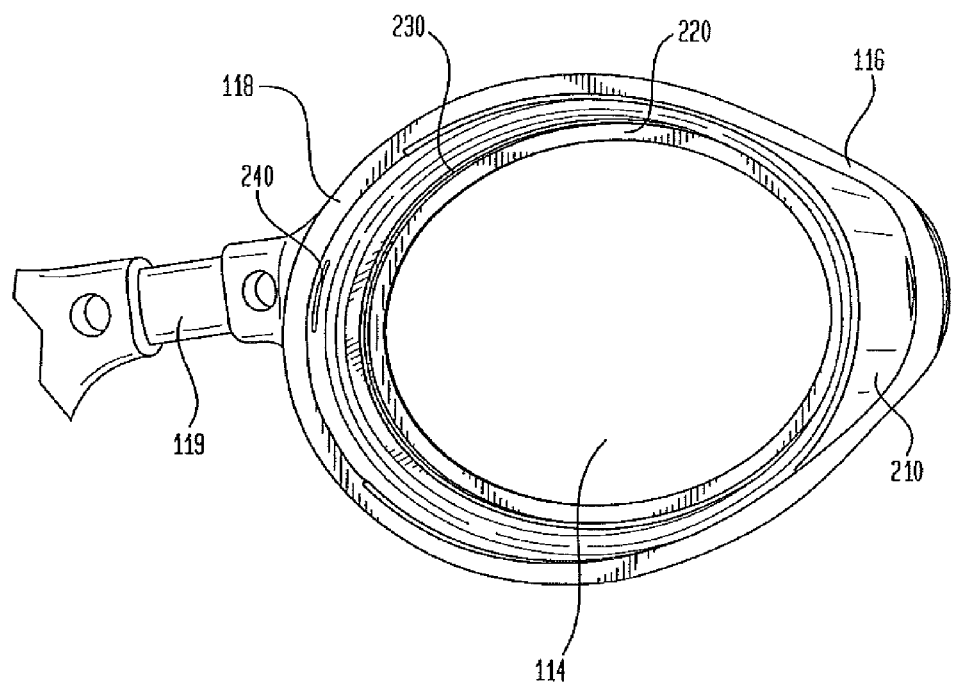
FIG. 2 is a rear elevational of a frame of the goggles of FIG. 1, according to an embodiment of the disclosure.

Now referring to FIG. 2, the sub-frame 112 has a temporal end 116 and a nasal end 118. In an exemplary embodiment, a strap 119, which may be flexible, connects the nasal end 118 of the first sub-frame 110 to the nasal end 118' of the second sub-frame 110', thereby forming the frame 110. The sub-frame 112 has a bracket 210 extending at the temporal end 116. The bracket 210 extends at an angle a (see FIG. 5) from the opening 114. By way of non-limitation example only, the angle a may range from about 30° to about 60°. The bracket 210 includes an eyelet 212 (FIG. 1). A clip extension 214 is defined adjacent to the eyelet 212. A peripheral lip 220 surrounds the opening 114. A shoulder 230 is defined surrounding the peripheral lip 220. The sub-frame 112 further includes an indent 240 along an inner surface thereof adjacent to the nasal end 118 above the shoulder 230. The sub-frame 112 may be formed of a rigid material, and by way of non-limiting example only, be formed by injection molding, such as with a thermoplastic material.

Referring now to FIG. 3, the eye-piece 120 includes a relatively thick body 121 having a contour generally corresponding to the contour of the sub-frame 112. The thickness of the body 121 provides sufficient rigidity to the body to maintain its shape under normal usage. Still further, as will be explained later, the thickness of body 121 serves to create a seal against the side of the face of the wearer. A generally tubular segment 122 extends from the body 121 having a free edge 123 and defines the opening 124. The free edge 123 abuts and urges the second lens 150 against the peripheral lip 220 when the first eye-piece 120 is secured to the sub-frame 112. The free edge 123 thus forms a seal with the second lens 150 to keep water out of a chamber defined behind the second lens 150. The tubular segment 122 includes an internal groove 126 defined along an internal surface of the tubular segment and an external groove 128 defined along an external surface of the tubular segment.

The internal groove 126 is proximal to the free edge 123 whereas the external groove 128 is proximal to the body 121. The internal groove 126 is configured to receive and to releasably secure the first lens 140 therewithin. The internal groove 126 also serves to seal the first lens 140 so as to prevent water from passing to a gap 250 (FIG. 9) between the first lens 140 and the second lens 150. The internal diameter of the internal groove 126 is slightly less than the outer diameter of the first lens 140. Thus, insertion of the first lens 140 into the internal groove 126 results in a slight circumferential expansion of the tubular segment 122. The insertion of the first lens 140 also serves as an endoskeleton for the eye-piece 120, ensuring that the eye-piece maintains its form during use. The expansion of the tubular segment 122 also serves to secure the eye-piece 120 to the connecting member 130, as described below.

A relatively thin and flexible skirt 129 extends peripherally from the body 121 and is configured to conform to the contours of an eye-socket of a user. The skirt 129 is much thinner relative to the body 121. In an exemplary embodiment, while the thickness of the body 121 may range from about 4 millimeters (mm) to about 10 mm, the thickness of the skirt 129 may range from about 1 mm to about 2.5 mm. The flexible skirt 129, upon application of pressure, for example, when the goggles 100 are worn by a user, is configured to produce at least a partial vacuum and prevent or minimize entry of water from between the skirt 129 and the skin of the user by forming a substantially water-tight interface with the skin of the user. In an exemplary embodiment, the eye-piece 120 may be molded with a flexible material such as silicone. In another configuration, the eye-piece 120 may be molded with a soft thermoplastic rubber (TPR).

Referring now to FIG. 4, the connecting member 130 includes a base 131 and a contoured brace 132 extending from the base. In an exemplary embodiment, the connecting member 130 may be rigid and formed with a thermoplastic material. The connecting member 130 serves as a clip for securing the eye-piece 120 to the sub-frame 112. A peripheral stub 135 extends from the base 131 and defines the opening 134 therewithin. A tab 136 is defined proximal to the free end of the contoured brace 132. As will be explained below, the tab 136 serves to secure the connecting member 130 to the first sub-frame 112. An internal ridge 137 is defined along an interior surface 138 of the peripheral stub 135. The peripheral stub 135 is configured to surround the tubular segment 122 of the eye-piece 120 such that the internal ridge 137 is received by the external groove 128 of the eye-piece 120. The contoured brace 132 has a contour generally corresponding to the contour of the body 121 of the eye-piece 120 such that when the tubular segment 122 of the eye-piece is inserted into the opening 134, the base 131 and the contoured brace 132 are in contact engagement with the body 121. A ridge 139 is defined on the peripheral stub 135 and is configured to be received by the indent 240 at the nasal end 118 of the sub-frame 112 for engagedly snapping the connecting member 130 with the sub-frame.

Figure 5:
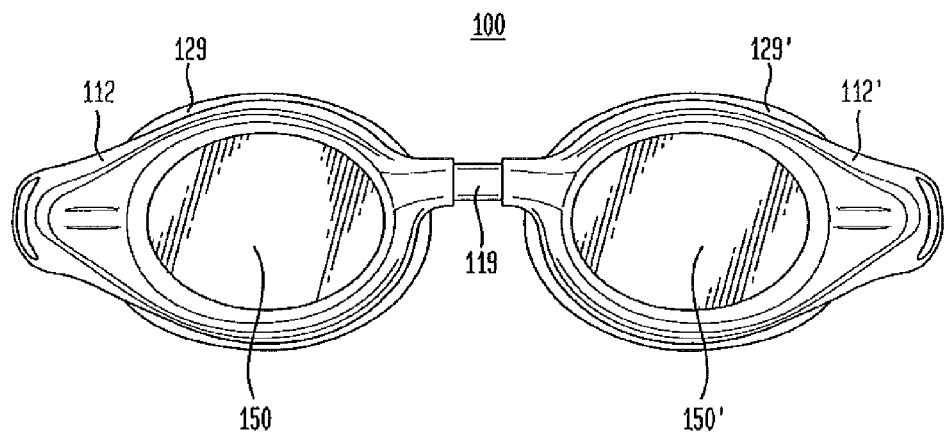
FIG. 5 is a front elevational view of the swimming goggles of FIG. 1.
Figure 6:
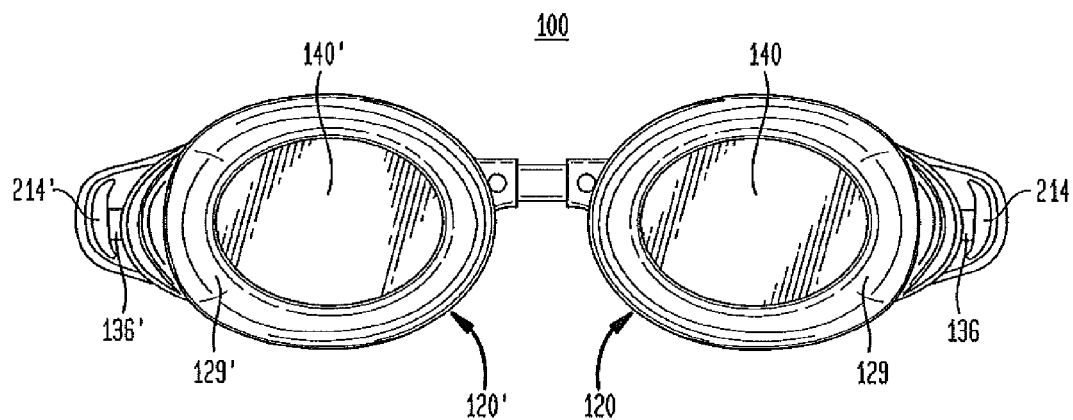
FIG. 6 is a rear elevational view of the swimming goggles of FIG. 1.
Figure 7:
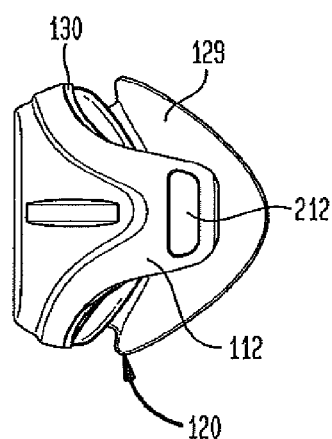
FIG. 7 is a side elevational view of the swimming goggles of FIG. 1.
Figure 8:
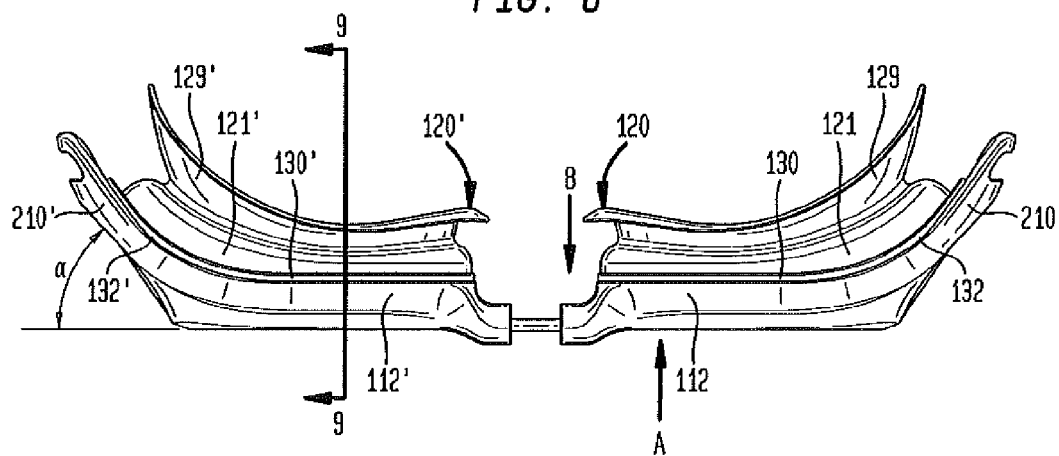
FIG. 8 is a top view of the swimming goggles of FIG. 1.

Referring now to FIGS. 5-9, different views of the swimming goggles 100 in an assembled state are illustrated. For instance, FIG. 5 illustrates a front elevational view of the swimming goggles 100 including the first and the second sub-frames 112, 112' connected to one another via the strap 119. In the front view, lenses 150, 150' are visible. FIG. 6, on the other hand, illustrates a rear elevational view of the swimming goggles 100. The first and the second eye-pieces 120, 120' secured to the first and the second flexible skirts 129, 129', respectively, are visible. Also illustrated are the first and the second tabs 136, 136' engaged with the first and the second clip extensions 214, 214', respectively. Lenses 140, 140' are visible in the rear view of FIG. 6. FIG. 7, which illustrates a side elevational view of the swimming goggles 100, illustrates the eye-piece 120 releasably secured to the sub-frame 112 via the connecting member 130. An exemplary contour of the flexible skirt 129 is illustrated in FIG. 7, whereby the flexible skirt 129 is configured to conform to the eye-socket of a user. FIG. 8 shows a top view of the swimming goggles 100, wherein exemplary contours of the first and the second sub-frames 112, 112', the first and the second connecting members 130, 130', the first and the second bodies 121, 121' of the first and the second eye-pieces 120, 120', the first and the second brackets 210, 210', and the contoured braces 132, 132' are illustrated.

Figure 9:
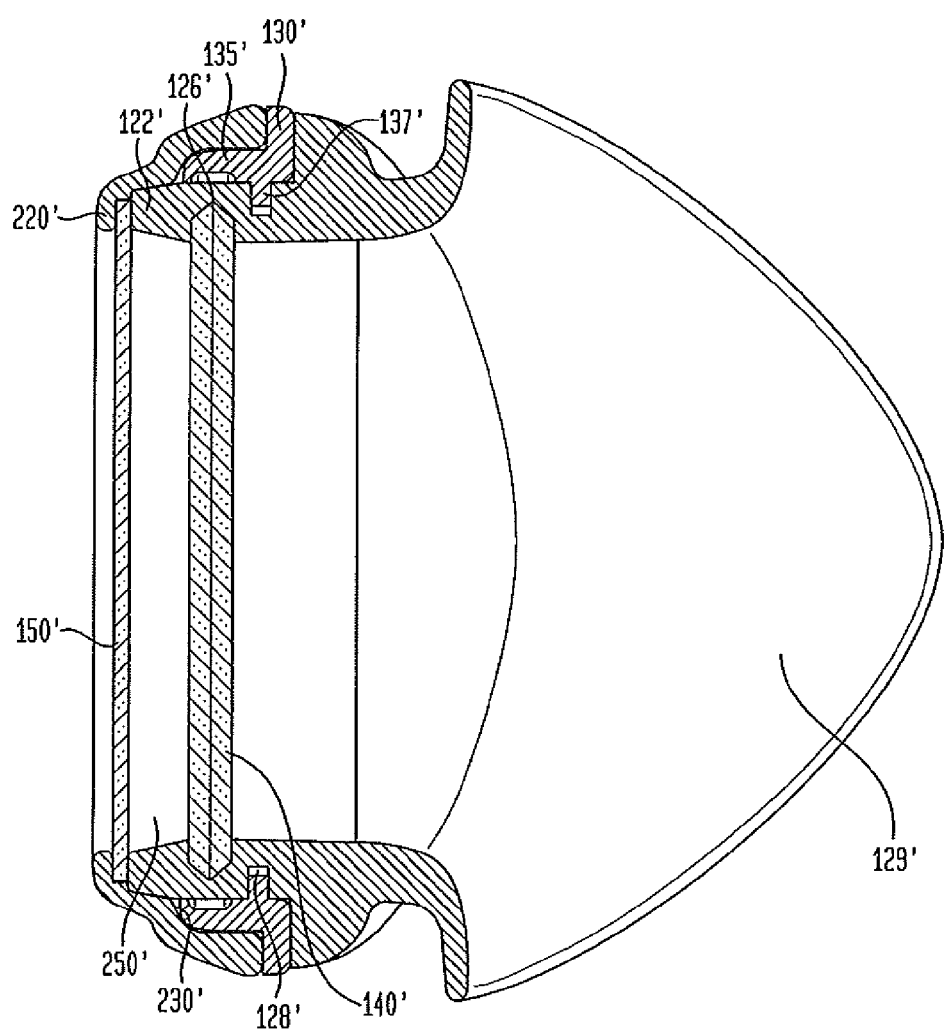
FIG. 9 is a cross-sectional view along line 9-9 of FIG. 8.

Finally, FIG. 9 illustrates a cross-section view along the line 9-9 in FIG. 8. The lens 150' is secured between the peripheral lip 220' and the tubular segment 122' of the eye-piece 120'. The lens 140' is secured within the internal groove 126' of the tubular segment 122'. The eye-piece 120' is held by the stub 135' of the connecting member 130' such that the external ridge 137' is received in the external groove 128' of the tubular segment. The tubular segment 122' thus creates a chamber or a gap 250' between the lenses 140' and 150'.

In an exemplary embodiment, the lens 140 and lens 140' may be prescription or corrective lenses designed to correct vision. Since air is present in the gaps 250 and 250', between the lenses 140 and 150 and between the lenses 140' and 150', respectively, conventional prescription lenses may be used as the first lens 140 and the first lens 140'. Thus, a pair of swimming goggles 100 equipped with prescription lenses help the wearer see better in and out of water as well as protect the eyes of the wearer in a manner similar to conventional swimming goggles. In another embodiment, only one of the lenses 140 and 140' may be a corrective lens, depending on the requirements of a particular wearer. Still further, lenses 140 and 140' may have similar or different power specifications, depending on the needs of a particular wearer. Lenses 140 and 140' may also be configured to address different components of a sphero-cylindrical correction, for example, spherical component, cylinder component and axis component, depending on the requirements of a particular wearer. One or both of lenses 140 and 140' may be a single vision lens, a bifocal lens, a trifocal lens, a progressive lens, an adjustable focus lens and a plano lens, as these terms are understood in the art.

Still further, the gap 250 may act as an insulator between the lenses 140 and 150 by creating a temperature difference between the lenses 140 and 150 with respect to the user and surrounding environment, respectively. Thus, while the lens 150 may be exposed to the external temperature, for example, that of the cold water, the air gap 250 stages a temperature difference at the lens 140. This reduction in the temperature differential between the trapped air and the lens 140 may eliminate or at least reduce the extent of fogging or condensation on the lens.

In an exemplary embodiment, lens 140 may be a corrective or prescription lens and made of any of materials such as glass, polycarbonate, allyl diglycol carbonate (ADC) or Columbia Resin #39 (CR-39), and urethane based pre-polymer, such as one available commercially under the trade-mark TRIVEX®. Other suitable materials for prescription corrective lenses may also be used for the lens 140. The lens 150 may be made of a thermoplastic polymer such as polycarbonate. In an exemplary configuration, the lens 140 may have a thickness in the range of about 2 millimeters (mm) to about 6 mm and the lens 150 may have a thickness in the range of about 0.5 mm to about 0.75 mm. It will further be understood that the dimensions set forth above are exemplary and may be varied depending on the requirements of a particular application. While the cross-sectional view of the lens 140' depicts a generally linear profile, it will be understood that the lenses 140, 140' may, in fact, have a curved profile as found in conventional corrective lenses.

Now will be described steps for assembling the components described to form the swimming goggles 100 with reference to FIG. 1. The lens 150 is seated on the peripheral lip 220 (FIG. 2) extending across the opening 114. The eye-piece 120 is inserted through the connecting member 130 such that the internal ridge 137 of the peripheral stub 135 is received into the external groove 128 of the tubular segment 122. The lens 140 is received into the internal groove 126 of the tubular segment 122 of the eye-piece 120. Since the lens 140 is sized slightly greater than the internal size of the internal groove 126, the lens 140 stretches and urges the tubular segment 122 against the peripheral stub 135. The tab 136 of the contoured brace 132 is then urged against the clip extension 214 (FIG. 6) and the nasal end of the eye-piece 120, along with the connecting member 130, is pushed against the sub-frame 112 until the ridge 139 of the peripheral stub 135 is received into the indent 240 (FIG. 2). The connecting member 130 thus snap-fits against the sub-frame 112 releasably securing the eye-piece 120 to the sub-frame. The pressure exerted by the connecting member 130 and the eye-piece 120 pushes the lens 150 against the peripheral lip 220, thereby creating a substantially water-tight connection between the lens 150 and the eye-piece 120. In an exemplary configuration, a strap (not shown) may be connected to the first and the second eye-lets 212, 212' such that the swimming goggles may be worn by a user with the strap generally circumscribing the user's head. Such a strap may help hold the eye-pieces 120, 120' closely against the user's face, thereby preventing entry of water into the space between the swimming goggles and the user's face.

Referring back to FIG. 8, the swimming goggles 100 may be disassembled by first pushing the assembly of the lens 150, the eye-piece 120 and the connecting member 130 proximal the nasal end 118 in the direction shown by the arrow A while simultaneously holding the nasal end 118, thereby effectively pushing the first sub-frame 112 in the direction shown by the arrow B. As a result, the ridge 139 (analogous to the ridge 139' in FIG. 1) will first disengage from the indent 240 (see FIG. 2) and the tab 136 (see FIG. 6) may be disengaged from the clip extension 214 (see FIG. 6).

An advantage of the swimming goggles described above is that any of the lenses 140, 140', 150, and 150' may be changed by a user (or an eye-care professional) with ease. For instance, if one or both of the corrective lenses 140, 140' need to be changed, for example, because of a changed prescription, the user may remove the lens and replace the same with an appropriate corrective lens. Likewise, if one or both of the lenses 150, 150' need to be changed, for example, due to wear and tear, the user (or an eye-care professional) may replace them.

Figure 10:
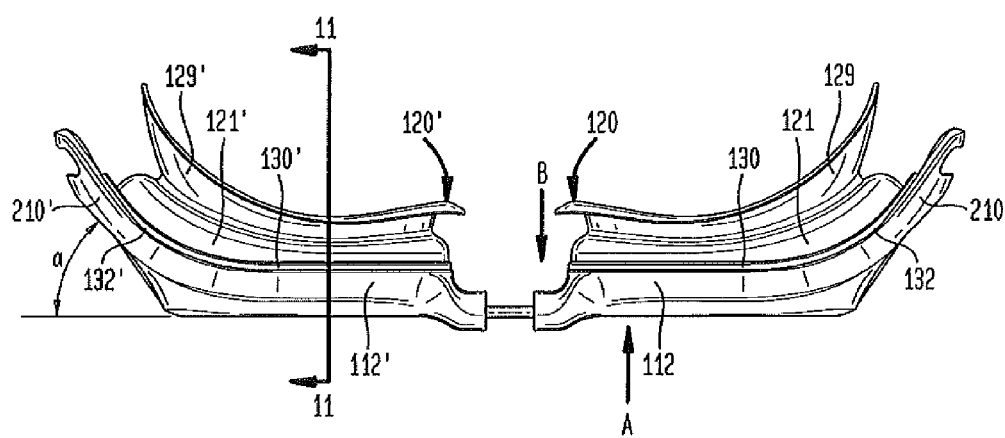
FIG. 10 is a top view of a swimming goggles, according to another embodiment of the disclosure.
Figure 11:
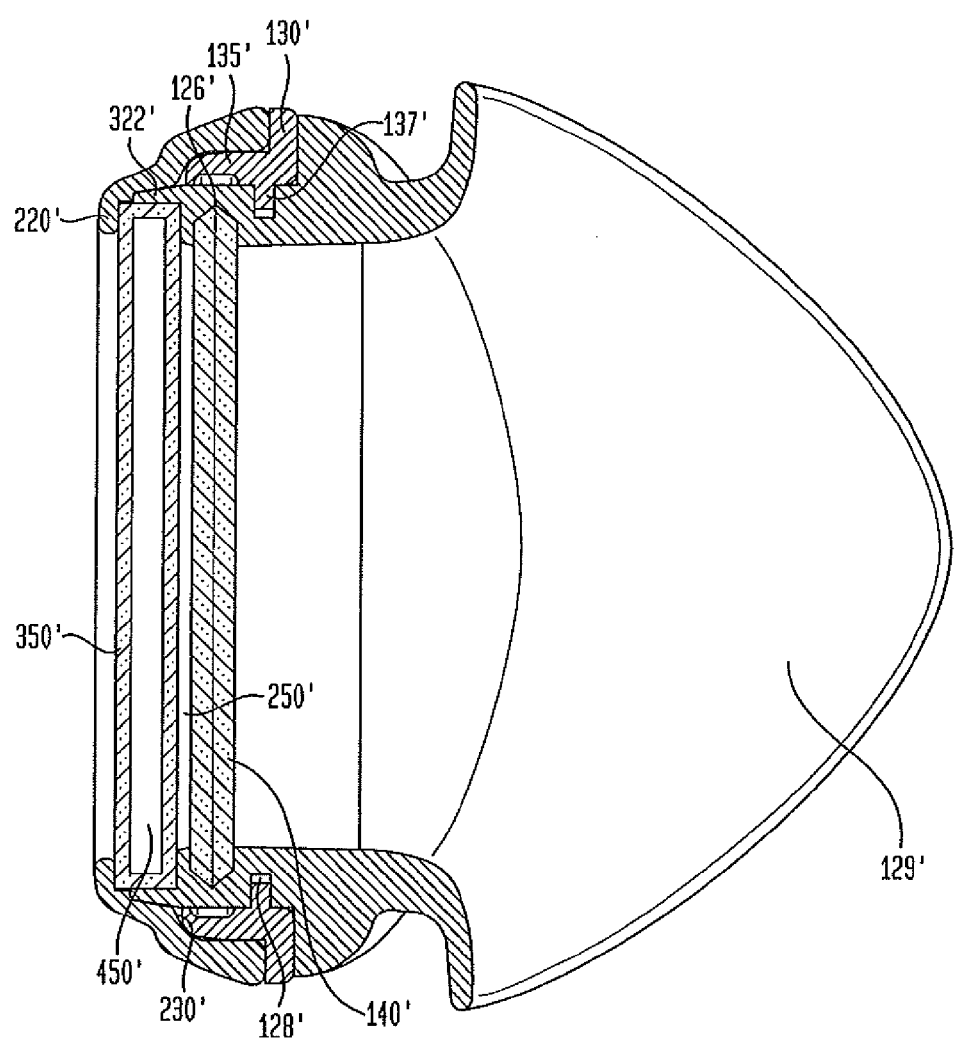
FIG. 11 is a cross-sectional view along line 11-11 of FIG. 10.

The eye-piece 120 and the connecting member 130 described above are but one exemplary manner of holding and securing two lenses 140, 150 with a gap 250 therebetween to a pair of goggles. Thus, other manners may be adopted to create a gap between a corrective lens and a non-corrective lens, which gap may be filled with air or other suitable medium. Referring now to FIGS. 10 and 11, another embodiment of swimming goggles is illustrated. The lens 150' may be replaced with a sealed unit 350' and the eye-piece 120' may be suitably modified to include a tubular segment 322' designed to securely accommodate the sealed unit 350'. In an exemplary configuration the sealed unit 350' may be a plano lens with a gap or chamber 450' defined therewithin. The gap or chamber 450' may be filled with an inert gas, for example. In the illustrated embodiment, there is a gap 250' between the sealed unit 350' and the lens 140'. In another embodiment, however, there may be no gap between the sealed unit 350' and the lens 140'. In such a case, the sealed unit 350' and the lens 140' may be designed to be nested along one another without a gap therebetween.

In yet another embodiment, the lens 140 may be removed from the goggles. Instead, the sealed unit 140' may be designed to incorporate a corrective lens on one side of the gap 450' and a plano lens on the other side of the gap 450'. The tubular segment 122' or 322' may be appropriately modified to accommodate such a sealed unit 450'. In this configuration, the gap 450' may be filled with air or other medium suitable for the material of the corrective lens.

Although the present disclosure herein has described particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present claims. For example, while the disclosure has been in terms of a pair of swimming goggles, it will be understood that other goggles, for example, skiing goggles, snow goggles, and diving goggles, may also be made using the principles and the components described herein and are deemed to within the scope of the disclosure.

It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A swimming goggles kit comprising:
    a frame having a first sub-frame and a second sub-frame having a first opening and a second opening defined therein, respectively, each of the first and the second sub-frames having a nasal end and a temporal end, a first bracket extending from the temporal end of the first sub-frame and a second bracket extending from the temporal end of the second sub-frame, a first indent and a second indent defined along the nasal ends of the first and the second sub-frames, respectively, a first clip extension and a second clip extension defined proximal to the free ends of the first and the second brackets, respectively;
    a first peripheral lip formed about the first opening and a second peripheral lip formed about the second opening;
    a first and a second lens configured to be received in the first and the second sub-frames, respectively, and to be supported by the first peripheral lip and the second peripheral lip, respectively;
    a first and a second eye-piece having a first tubular segment and a second tubular segment, respectively, and
    configured to abut the first and the second lens along the first and the second peripheral lips, respectively, the first and the second tubular segments having a first and a second internal groove defined therein, respectively, and a first external groove and a second external groove, respectively;
    a third lens and a fourth lens configured to be received in the first and the second internal grooves, respectively; and
    a first connecting member and a second connecting member having a first peripheral stub extending from a first base and a second peripheral stub extending from a second base, respectively, the first and the second peripheral stubs including a first internal ridge and a second ridge, respectively, configured to be received in the first and the second external grooves, respectively, each of the first and the second connecting members having a nasal end and a temporal end, a first contoured brace and a second contoured brace extending from the first and the second temporal ends of the first and the second connecting members, respectively,
    wherein the first and the second braces comprise a first tab and a second tab, respectively,
    wherein the first and the second connecting members comprise a first and a second ridge proximal to the nasal ends thereof configured to be received in the first and the second indents of the first and the second windows, respectively, and
    wherein an insertion of the first and the second ridges into the first and the second indents and an interlocking of the first and the second tabs with the first and the second clip extensions are configured to hold the first and the second connecting members to the first and the second sub-frames, respectively, in a snap-fit connection.

2. The swimming goggles of claim 1, wherein at least one of the third and fourth lenses comprises a corrective lens.

3. The swimming goggles of claim 1, wherein the first and the second eye-pieces are configured to conform to the contour of a user's eye-sockets.

4. The swimming goggles of claim 1, further comprising:
a first air gap between the first and the third lenses; and
a second air gap between the second and the fourth lenses.

\* \* \* \* \*